(12) United States Patent
Borger et al.

(10) Patent No.: US 9,892,421 B2
(45) Date of Patent: Feb. 13, 2018

(54) MEASURING DISPLAY EFFECTIVENESS WITH INTERACTIVE ASYNCHRONOUS APPLICATIONS

(71) Applicant: INTERNATIONAL BUSINESS MACHINES CORPORATION, Armonk, NY (US)

(72) Inventors: Sergio Borger, São Paulo (BR); Marcia Ito, São Paulo (BR); Julio Nogima, São Paulo (BR); Ademir Ferreira Da Silva, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

(21) Appl. No.: 14/703,663

(22) Filed: May 4, 2015

(65) Prior Publication Data
US 2016/0328614 A1    Nov. 10, 2016

(51) Int. Cl.
```
G06K 9/00       (2006.01)
G06Q 30/02      (2012.01)
H04N 21/81      (2011.01)
H04N 21/442     (2011.01)
H04N 21/44      (2011.01)
H04N 21/8547    (2011.01)
```

(52) U.S. Cl.
CPC ..... G06Q 30/0246 (2013.01); G06K 9/00268 (2013.01); G06K 9/00288 (2013.01); G06K 9/00718 (2013.01); H04N 21/44008 (2013.01); H04N 21/44213 (2013.01); H04N 21/44218 (2013.01); H04N 21/812 (2013.01); *G06K 2009/00738* (2013.01); *G06T 2207/30242* (2013.01); *H04N 21/8547* (2013.01)

(58) Field of Classification Search
CPC ........... G06K 9/00268; G06K 9/00288; G06K 9/00718; G06Q 30/0241–30/0246; H04N 21/44008; H04N 21/44213; H04N 21/442–21/4425; H04N 21/812
See application file for complete search history.

(56) References Cited

U.S. PATENT DOCUMENTS

| | | | |
|---|---|---|---|
| 7,552,458 B1* | 6/2009 | Finseth | G06Q 30/0225 705/14.26 |
| 8,180,677 B2* | 5/2012 | White | G06Q 30/0277 370/229 |
| 8,437,776 B2* | 5/2013 | Busch | H04W 4/02 370/338 |
| 2002/0156680 A1* | 10/2002 | Casserly | G06Q 10/087 705/14.41 |
| 2005/0088407 A1* | 4/2005 | Bell | G06Q 30/02 345/156 |

(Continued)

*Primary Examiner* — Sean Motsinger
(74) *Attorney, Agent, or Firm* — F. Chau & Associates, LLC

(57) ABSTRACT

A system to measure effectiveness of displayed content includes a video processing service configured to receive and process a stream of video images captured by one or more video cameras, a display application service configured to produce display content to be displayed on one or more display monitors and to capture user interactions with the displayed content, and a display effectiveness service configured to correlate data received from the video processing service and the display application service and generate a display effectiveness measurement that is a measure of an effectiveness of the displayed content for specific periods of time.

18 Claims, 6 Drawing Sheets

(56) References Cited

U.S. PATENT DOCUMENTS

| | | | | |
|---|---|---|---|---|
| 2007/0271518 A1* | 11/2007 | Tischer | H04H 60/31 | 715/744 |
| 2008/0232641 A1* | 9/2008 | Borger | G07F 9/026 | 382/103 |
| 2008/0316372 A1* | 12/2008 | Xu | G09G 3/20 | 348/739 |
| 2009/0048908 A1* | 2/2009 | Kaplan | G06Q 30/02 | 705/7.33 |
| 2009/0119164 A1* | 5/2009 | Colson | G06Q 30/02 | 705/14.14 |
| 2010/0036719 A1* | 2/2010 | Eklund | G06Q 30/0241 | 705/14.4 |
| 2010/0198680 A1* | 8/2010 | Ma | G06Q 30/02 | 705/14.45 |
| 2011/0078726 A1* | 3/2011 | Rosenberg | G06Q 30/02 | 725/34 |
| 2011/0246288 A1* | 10/2011 | Kwon | G06Q 30/02 | 705/14.45 |
| 2011/0320263 A1* | 12/2011 | Yamada | G06Q 30/0246 | 705/14.45 |
| 2012/0030006 A1* | 2/2012 | Yoder | G06Q 30/0201 | 705/14.41 |
| 2013/0138499 A1* | 5/2013 | Tu | G06Q 30/0241 | 705/14.41 |
| 2014/0130182 A1* | 5/2014 | Yackanich | G06F 21/60 | 726/27 |
| 2015/0120433 A1* | 4/2015 | Chaouki | G06Q 30/0242 | 705/14.41 |
| 2016/0219332 A1* | 7/2016 | Asbun | H04N 21/42201 | |
| 2016/0328741 A1* | 11/2016 | Borger | G06Q 30/0246 | |

* cited by examiner

MEASURING DISPLAY EFFECTIVENESS WITH INTERACTIVE ASYNCHRONOUS APPLICATIONS

BACKGROUND

Technical Field

Embodiments of the present disclosure are directed to measuring the effectiveness of content being presented on a display to produce an interaction by a viewer, and in particular, to calculating how many people in front of a display/projector, in a given moment, interacted with the display/projector in response to the content viewed.

Discussion of the Related Art

Certain applications may produce an interaction that is not immediate or in sync with content being presented on a display. For example, a sale advertisement can offer a certain product but the effective buying action may occur later in time, e.g., the prospective buyer may move away from the display device and decide at a future moment to execute the purchase. It is assumed that a code or number presented at the screen at the moment of the viewing can be used to identify the particular item.

Traditionally, evaluation effectiveness is performed with human assistance using statistical models based on human behavior. These statistical models are dependent on frequent manual surveys. Depending on the required accuracy, long and complex structured surveys are used. For example, collaborators located at a display site can interview viewers to evaluate how effective is the content being presented and estimate the likelihood of an interaction.

However, such invasive approaches and manual methods can be both expensive and ineffective, especially when prospective viewers have high mobility, as in a display positioned in hall of a shopping mall. In this scenario, interviewers may be too slow and/or make mistakes in such repetitive and stressful work. In addition, besides being error prone, these human-based approaches do not scale well.

Current solutions cannot measure the effectiveness in a timely basis, i.e., in pre-defined intervals of time. This type of information can be critical to evaluate how effectively the displayed information is being delivered, for example during a day. A particular content may more effectively produce an interaction during certain hours of the day, and this information is valuable to merchants. The content of the display could be adjusted to present only the most effective items during different periods of the day. Depending on where the display is placed, for example, on a subway platform during a major local event, maintaining constant accuracy of measurement using traditional methods can be impractical.

SUMMARY

According to an embodiment of the disclosure, there is provided a system to measure effectiveness of displayed content, including a video processing service configured to receive and process a stream of video images captured by one or more video cameras, a display application service configured to produce display content to be displayed on one or more display monitors and to capture user interactions with the displayed content, and a display effectiveness service configured to correlate data received from the video processing service and the display application service and generate a display effectiveness measurement that is a measure of an effectiveness of the displayed content for specific periods of time.

According to a further embodiment of the disclosure, user interactions are captured when a user views the content on a display monitor, or after the user has viewed the displayed content.

According to a further embodiment of the disclosure, user interaction data includes information associated with a viewing time of the content.

According to a further embodiment of the disclosure, the video processing service uses face detection and face tracking algorithms to analyze the stream of video images to detect faces and to track the detected faces through consecutive images in the stream of video images, and stores face tracking events in a video database.

According to a further embodiment of the disclosure, the display application service includes a time code model that associates unique codes that identify specific periods of time to time slots, a time code parser configured to extract data regarding a time period from user interaction data and store the user interaction data indexed with the extracted time period into a user interaction database, a time code generator configured to generate a code that identifies based on the time code model a particular period of time at which content will be displayed, and an application content module configured to insert the code created by the time code generator into the content to be displayed on the one or more display monitors.

According to a further embodiment of the disclosure, the display effectiveness service includes a time window module configured to generate a time slot list for a reference time period in increments defined by an interval, a video event counter module configured to count from the face tracking events a number of people viewing content on a display over the reference time period, an interaction counter module configured to count from the user interaction data indexed with the extracted time period a number of people who viewed the displayed content over the reference time period and interacted with the displayed content, and an effectiveness evaluator that relates the number of people viewing content on a display with the number of people who interacted with the displayed content over the preferential search time to determine an effectiveness over the period of time as a function of the interval.

According to a further embodiment of the disclosure, the effectiveness evaluator uses the following equation to calculate the effectiveness:

$$\text{Effectiveness (interval)}=[\text{Users Interaction (interval)}/\text{Video Users (interval)}]\times 100,$$

wherein Users Interaction is the number of people who interacted with the displayed content during the interval, and Video Users is the number of people who viewed content on the display during the interval.

According to another embodiment of the disclosure, there is provided a method for measuring effectiveness of displayed content, including determining a time window over which an effectiveness of displayed content is to be calculated, counting a number of viewers viewing content being displayed on a display monitor over the time window from a sequence of time-indexed face tracking events of viewers viewing content on said display monitor, counting a number of viewers who responded to said content displayed on said display monitor over the time window from a sequence of time indexed viewer interaction data of viewers responding to said content displayed on said display monitor, and calculating an effectiveness for the time window that relates the number of people viewing content on a display with the number of people who interacted with the displayed content from Effectiveness (time window)=[Users Interaction (time window)/Video Users (time window)]× 100, wherein Users Interaction is the number of people who responded to said content displayed during the time window, and Video Users is the number of people who viewed the content during the time window.

According to a further embodiment of the disclosure, viewers respond to said content displayed during the time window when the content is being displayed, or after the time window during which the content was displayed.

According to a further embodiment of the disclosure, determining a time window over which an effectiveness of displayed content is to be calculated includes determining a reference time period over which said effectiveness will be calculated, determining an interval for subdividing the reference time period into a plurality of time slots, and generating a list of time slots for the reference time period, wherein the effectiveness is calculated for each time slot in the time slot list, and the time window for each time slot is determined from the interval.

According to a further embodiment of the disclosure, the method includes receiving video data from a plurality of video cameras, wherein said video data includes time stamps, analyzing said video data to detect and track faces in the data, calculating a tracking period for each detected face from the time stamps, and saving face tracking events and the tracking periods in said sequence of time-indexed face tracking events.

According to a further embodiment of the disclosure, the method includes receiving a sequence of user interaction data of viewers responding to the content displayed on said display monitor, extracting a time code from an item of user interaction data in the sequence of user interaction data, calculating the time window from the time code using an interval that specifies a duration of the time window, associating said time window with said user interaction data item, and saving the user interaction data item and the associated time window in said sequence of time-indexed viewer interaction data.

According to a further embodiment of the disclosure, the method includes determining a time slot from an interval that specifies a duration of the time window and a current time, determining a time code associated with said time slot, inserting said time slot into application content to be displayed, and displaying said application content with said inserted time code.

According to a further embodiment of the disclosure, the time code is extracted from said item of user interaction data using a time code model, the time code model is used to associate a time slot with the time code, and the time slot is associated with the interval to determine the time window.

According to a further embodiment of the disclosure, a time code is associated with said time slot using a time code model.

According to another embodiment of the disclosure, there is provided a non-transitory program storage device readable by a computer, tangibly embodying a program of instructions executed by the computer to perform method steps for measuring effectiveness of displayed content.

DETAILED DESCRIPTION

Figure 1:
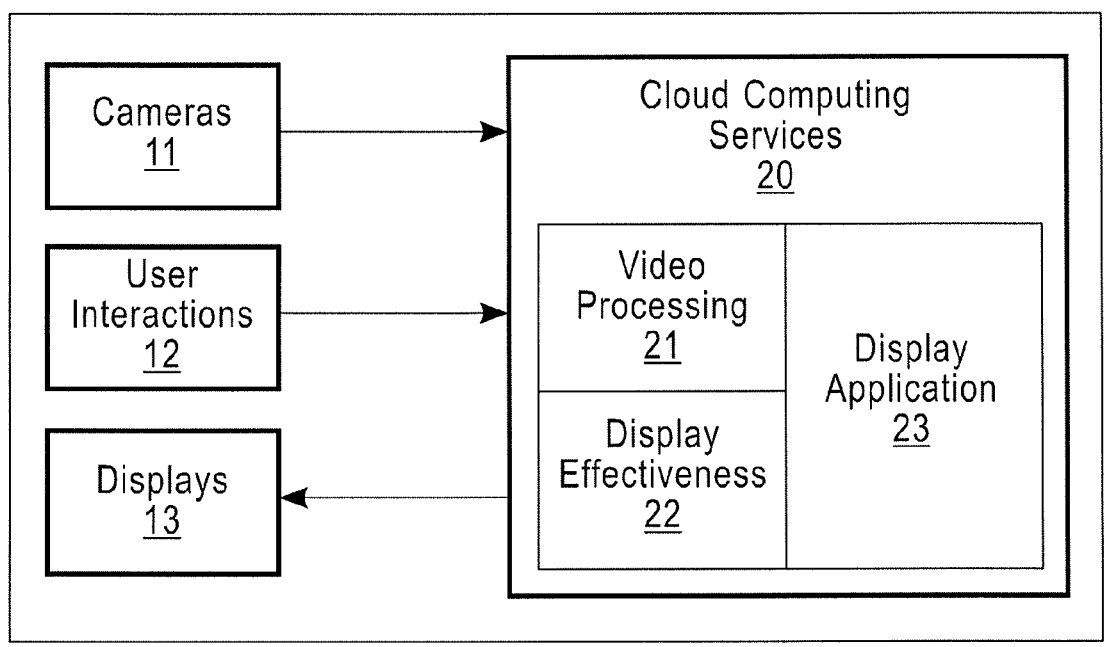
FIG. 1 is a diagram of the elements of a content effectiveness measurement system 10 and their interconnections, according to an embodiment of the present disclosure.

Exemplary embodiments of the disclosure as described herein generally include systems and methods that can automatically measure effectiveness of a display/projector that is broadcasting information to large number of people during a long time period in a more efficient way. Accordingly, while embodiments of the disclosure are susceptible to various modifications and alternative forms, specific embodiments thereof are shown by way of example in the drawings and will herein be described in detail. It should be understood, however, that there is no intent to limit embodiments of the disclosure to the particular exemplary embodiments disclosed, but on the contrary, embodiments of the disclosure cover all modifications, equivalents, and alternatives falling within the spirit and scope of the disclosure.

Embodiments of the present disclosure can provide a method based on video processing that can count the public in front a display/projector during a period of evaluation and also individually count the amount of time each person spent watching the display/projector during the same period. The system enforces that content published on the display implicitly contain a code that identifies a particular instance in time. Users interacting at the moment or later in time with the viewed content use information that contains that implicit code.

Embodiments of the present disclosure can correlate the number of viewers in a specific time period and the number of interactions resulting from the same group of viewers. Embodiments of the present disclosure can provide an automated system that is robust and scales well independent of the number of people to handle.

Video processing, in this context, is an infrastructure composed of video cameras, a communication structure, an IT infrastructure, etc., built to capture, store, index, and analyze video streams. Video can be captured from multiple points of view and different spots. This structure is typically used for solutions related to security and monitoring in different domains. Automated methods for video and image processing and analysis use software modules to process captured video streams. These processing methods are usually specialized for analyzing one or a few aspects of the video image. For example, there are modules for face capturing, face recognition, object tracking, object recognition, etc. Due to the large data volume and complexity of live video analysis, these software modules are usually resource demanding.

Embodiments of the present disclosure can combine information captured through a video surveillance system and reports of user interactions with a display system to produce a time-based view of display effectiveness. Embodiments of the present disclosure include a method to produce time-stamped information that is included in the content to be presented on the display. Embodiments of the present disclosure can target asynchronous applications where the interaction may occur when the user is no longer watching the display. The interaction with the displayed content is realized long after the content is viewed. Known solutions do not provide an automated way to correlate the user interaction with the moment he/she viewed the information that resulted in the interaction.

FIG. 1 is a diagram of the elements of a content effectiveness measurement system 10 according to an embodiment of the present disclosure and their interconnections. System 10 includes one or more video cameras 11, user interaction data 12, one or more display monitors 13, and a set of cloud computing services 20. The displays 13 are connected, either wired or wirelessly, to an internet infrastructure and can display an indexed content containing implicit codes in a public space. The video cameras 11 are connected, either wired or wirelessly, to an internet infrastructure and can capture images of people watching the displays 13, and are positioned so that a user's face is completely visible. Users engage with display content by replying to information published on the displays 13, for example by sending an SMS message to purchase an advertised item.

User interaction data 12 contains the same implicit code showed on a display 13 when this user viewed the display content. The cloud computing services 20 include a set of three services deployed on the cloud: a video processing service 21, a display application service 23, and a display effectiveness service 22. These cloud services create a backend infrastructure that can work with several cameras and displays together, processing results of these devices in a way to measure display effectiveness. The video processing service 21 can receive and process images of users captured by the camera(s) 11. The display application service 23 can produce the displayed content and capture the users interactions. The display effectiveness service 22 can correlate the data from the video processing service 21 and the display application service 23 and generate a display effectiveness measurement.

Figure 2:
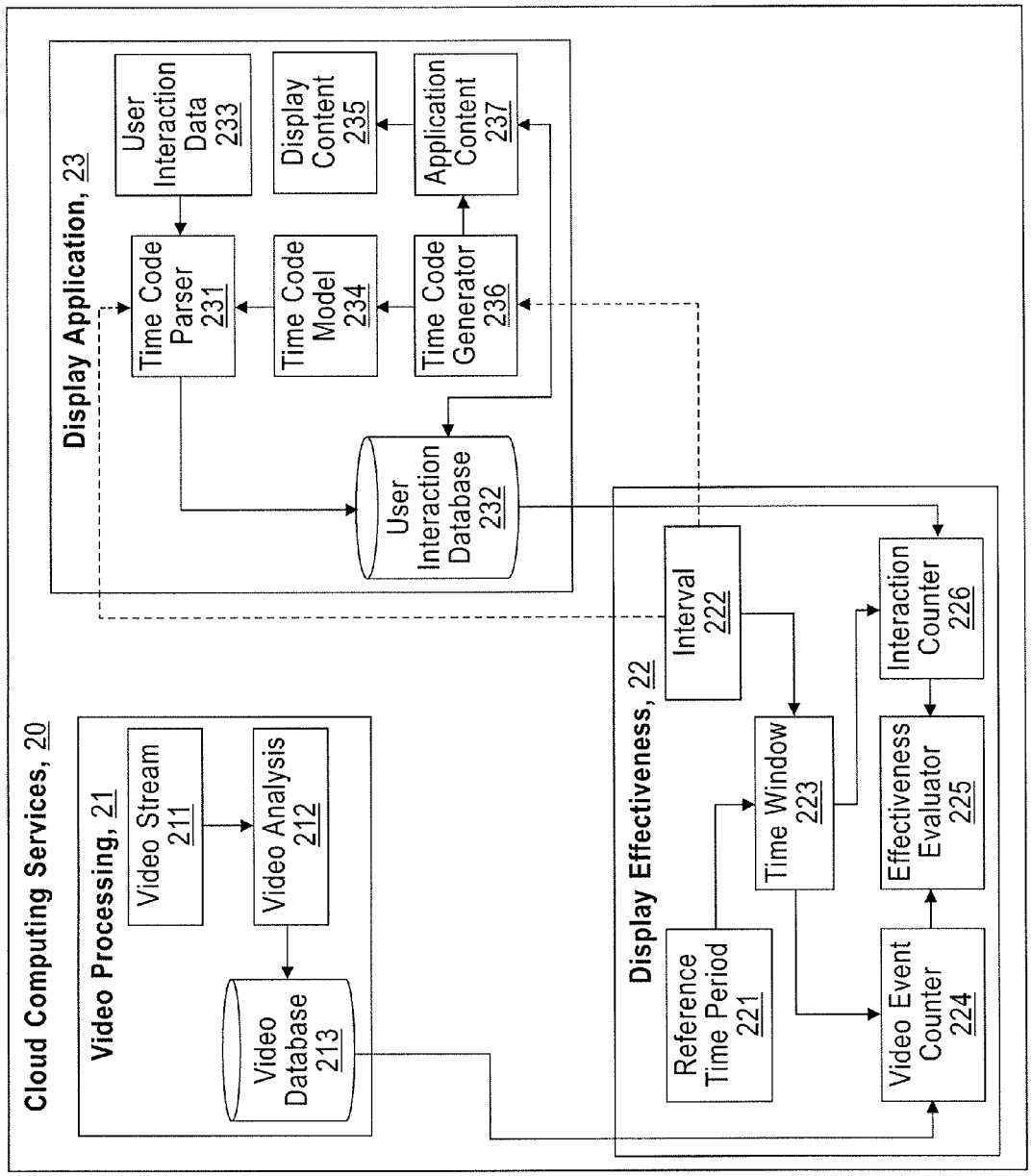
FIG. 2 shows details of the cloud computing services 20 and their interconnections, according to embodiments of the disclosure.

FIG. 2 shows details of the cloud computing services 20 and their interconnections, according to embodiments of the disclosure.

A video processing service 21 according to embodiments of the disclosure comprises a video stream 211, a video analysis module 212, and a video database 213. The video stream 211 includes all data produced by video devices, such as the cameras 11, routed to the video analysis module 212. Compatibility with respect to camera types, media formats and data rates are adjusted accordingly. The video analysis module 212 uses face detection and face tracking algorithms to analyze frames from cameras 11 and to detect shapes of faces. The video analysis module 212 can identify different faces appearing in each image and track them through consecutive images. The images may be time-stamped with the capture time, and each detected face has the tracking period calculated. The video database 213 can store and record all face tracking events indexed with the time period in datasets, and can share these events with the display effectiveness service 22.

A display application service 23 according to embodiments of the disclosure comprises user interaction data 233, display content module 235, time code parser 231, time code generator 236, application content module 237, time code model 234, and user interaction database 232.

User interaction data 233 includes all data created by users in response to content viewed on a display. Content published on displays can generate user engagement in the form of interactions with the display service, which introduce digitized data into a system according to embodiments of the disclosure. The user interaction data 233 can be communicated through, for example, SMS messages, web forms, etc.

The time code model 234 associates unique codes that can identify specific periods in time with a time slot. The model is based on an interval of time which is configurable, e.g. 1 hour, 15 min. The time code model 234 can specify periods of time with a granularity that is determined by the periodicity of the time intervals. Table 1, below, shows an example of a time code model, and shows the codes used to define slots of time. For example, if periodicity is one hour, time slot 1 is associated to the first hour of the day (12:00-12:59 AM), and time code AAA1 should be included on the display content showed during the first hour of the day.

TABLE 1

Example of a Time Code Model

| Time Slot | Time Code |
|---|---|
| 1 | AAA1 |
| 2 | AAA2 |
| 3 | AAA3 |
| 4 | AAA4 |
| 5 | AAA5 |
| 6 | AAA6 |
| ... | ... |

The time code parser 231 can extract data from user interaction data 233, localize an implicit code from the displayed content in this data and translate this code into a particular period of time, such as the display viewing time, using the time code model 234. It then stores the user interaction data 233 indexed with the retrieved period of time into the user interaction database 232.

The time code generator 236 can generate a code that identifies a particular period of time based on the time code model 234. This code is defined by the particular period of time and is inserted by the application content module 237 into the application content presented on the display.

The application content module 237 prepares all content to be showed on the display. The application content module 237 can provide an interface to a system administrator to manage the content of the display, for example to post, erase, edit and search messages. For each message to be posted on the display, in the case of a message board application, the application content module 237 attaches to it the code created by the time code generator 236. The resulting posted messages contain implicit codes that change periodically in a pre-defined interval.

The display content module 235 displays visual information generated by application content module 237 on the displays 13. Different displays can present content from different application content modules 237. It may be assumed that such applications provide identifiers used by viewers during their interaction with a system according to embodiments of the disclosure. The identifiers implicitly carry code provided by the time code generator module 236.

The user interaction database 232 can store all user interaction data 233. The interaction data 233 may be indexed with the period of time when the related display content was presented, e.g. 12:00-12:59 AM. This data can be shared with a display effectiveness service 22 according to embodiments of the disclosure.

A display effectiveness service 22 according to embodiments of the disclosure comprises an interval 222, a reference time period 221, a time window module 223, a video event counter module 224, an interaction counter module 226, and an effectiveness evaluator 225.

The interval 222 is a periodic reference time whose value is manually defined at the system (global) level. This parameter can define the interval of time by which the time code changes, e.g., 1 hour.

The reference time period 221 is a period of time over which an effectiveness analysis is performed. This period is defined by a start time and an end time that should be specified by the analysis requester. This period should cover one or more time windows. For example, one could request an effectiveness analysis over an entire day specifying start time as 12:00 AM and end time as 11:59 PM.

The time window module 223 generates a time slot list for the reference time period, e.g. 12:00-12:59 AM, for the interaction counter 226 and video event counter 224 modules. The time window module 223 generates the time slot list in increments defined by the interval 222, e.g. 1 hour. The time window module 223 starts with the value defined by search start time, and moves up incrementally until reaching the search end time. Each time slot is associated with a time code as defined in the time code model 234.

The video event counter module 224 counts user video events stored on the video database 213 over the reference time period (e.g. 12:00 AM to 12:59 AM). In other words, the video event counter module 224 counts the number of people watching the display in a given period.

The interaction counter module 226 counts interactions related to this period stored on the user interaction database 232 according to the reference time period (e.g. 12:00 AM to 12:59 AM). In other words, the interaction counter module 226 counts the number of people who viewed the display content in a given period of time and generated interaction.

The effectiveness evaluator 225 uses a mathematical formula that relates video user events with user interaction in a given period of time, such as the reference time period 221, to determine an effectiveness over the period of time. This evaluation can be more or less granular depending only on the defined interval. An exemplary, non-limiting formula is:

Effectiveness(Period of Time)=(Users Interaction/
Video Users)×100

Figure 3:
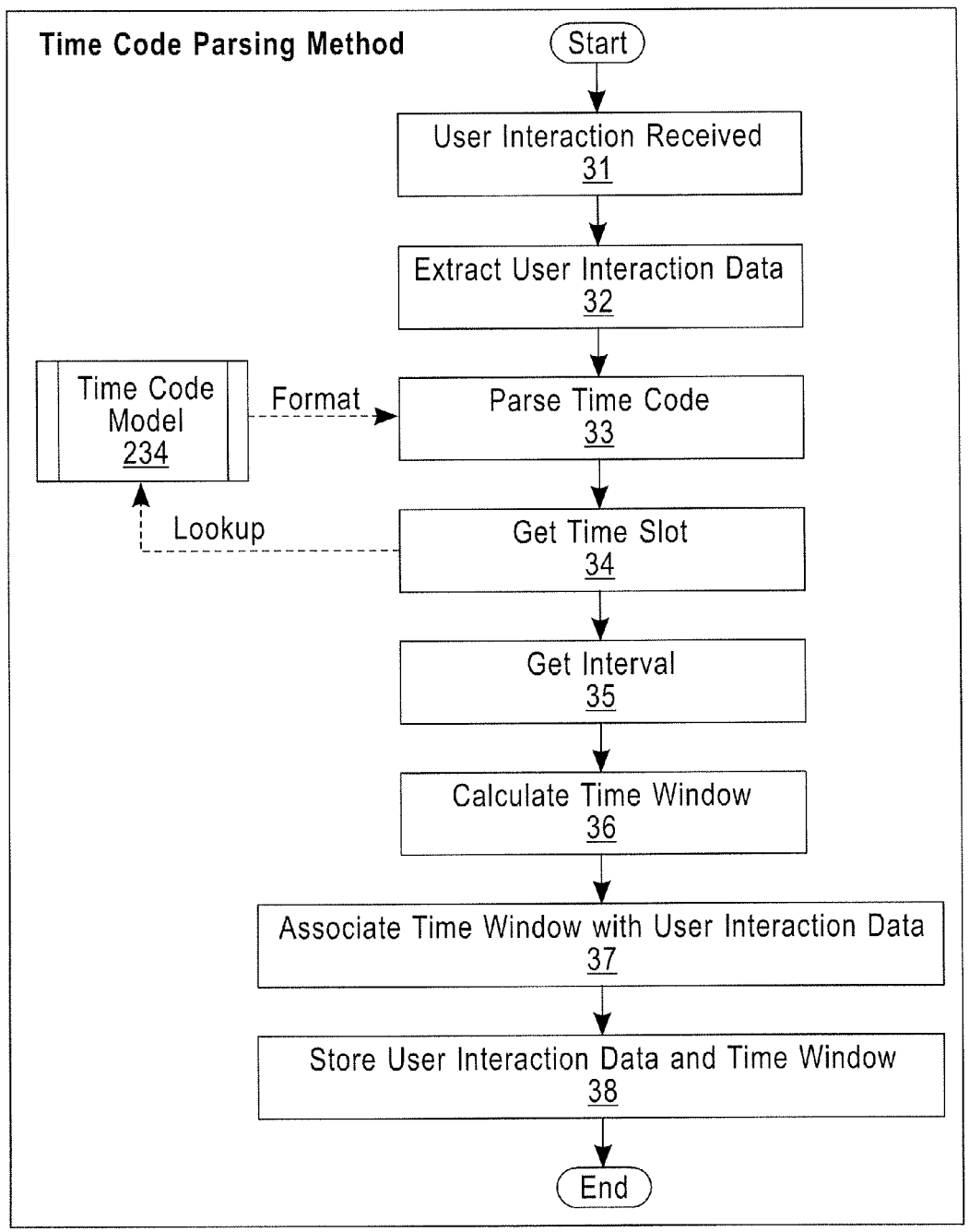
FIG. 3 is a flow chart of a time code parsing method according to an embodiment of the disclosure.

FIG. 3 is a flow chart of a time code parsing method according to an embodiment of the disclosure. Time code parsing uses user interaction data 233 and time code information to determine the associated time window and stores the user data indexed by the recovered time window. An exemplary, non-limiting example of time code parsing involves a scenario where the display application is a product selling application in which the content being presented on the display are products for sale. A prospective buyer interacts with the system by sending a message from his/her phone with identification of the item being purchased.

Referring now to the flow chart, a method begins at step 31 with the system receiving a user interaction. At step 32, once an interaction is received, the user interaction data is extracted. In an exemplary, non-limiting scenario, the data refer to an item purchase action. The data should contain information about the buyer and the product being purchased. The product description should include a unique product identifier for identification.

According to an embodiment of the disclosure, the product identifier carries information about the time period the product offer was displayed. The time code model 234 specifies the time code location in the user message and defines the message format, and may specify, for example, that the first 4 characters of the product identifier is the time code, and the product identifier can be parsed at step 33 to extract this information. For example, the time code retrieved may be AAA1.

Then, at step 34, and using Table 1 as example, a lookup in the time code model using the time code AAA1 returns a time slot of 1. The interval 222 defines the period on which the analysis is performed. A period of one-hour means the time slots identify periods of one hour. The interval value is defined at the system level and is used for time code generation/parsing and display effectiveness measurement.

At step 36, the time slot together with the interval value are used to calculate a time window, which is certain period of interest. Table 2 shows some examples of possible combinations between a time slot, an interval, and a time window. Referring to Table 2, in an exemplary, non-limiting scenario, time slot 1 with an interval of one-hour indicates the first hour of the day, 12:00 AM-12:59 AM.

TABLE 2

Example of time windows for combinations of time slots and intervals

| Time Slot | Interval | Time Window |
|---|---|---|
| 1 | 1 min | 12:00-12:01 |
| 1 | 15 min | 12:00-12:14 |
| 1 | 1 hour | 12:00-12:59 |
| 2 | 1 min | 12:01-12:02 |
| 2 | 15 min | 12:15-12:29 |
| 2 | 1 hour | 1:00-1:59 |

The user interaction data 233 received is associated with the calculated time window at step 37 for subsequent searches. According to an exemplary, non-limiting scenario, the time window is the period of time the user viewed the product offer on the display. Finally, at step 38, all user interaction data and their associated time windows are stored in the user interaction database 232.

Figure 4:
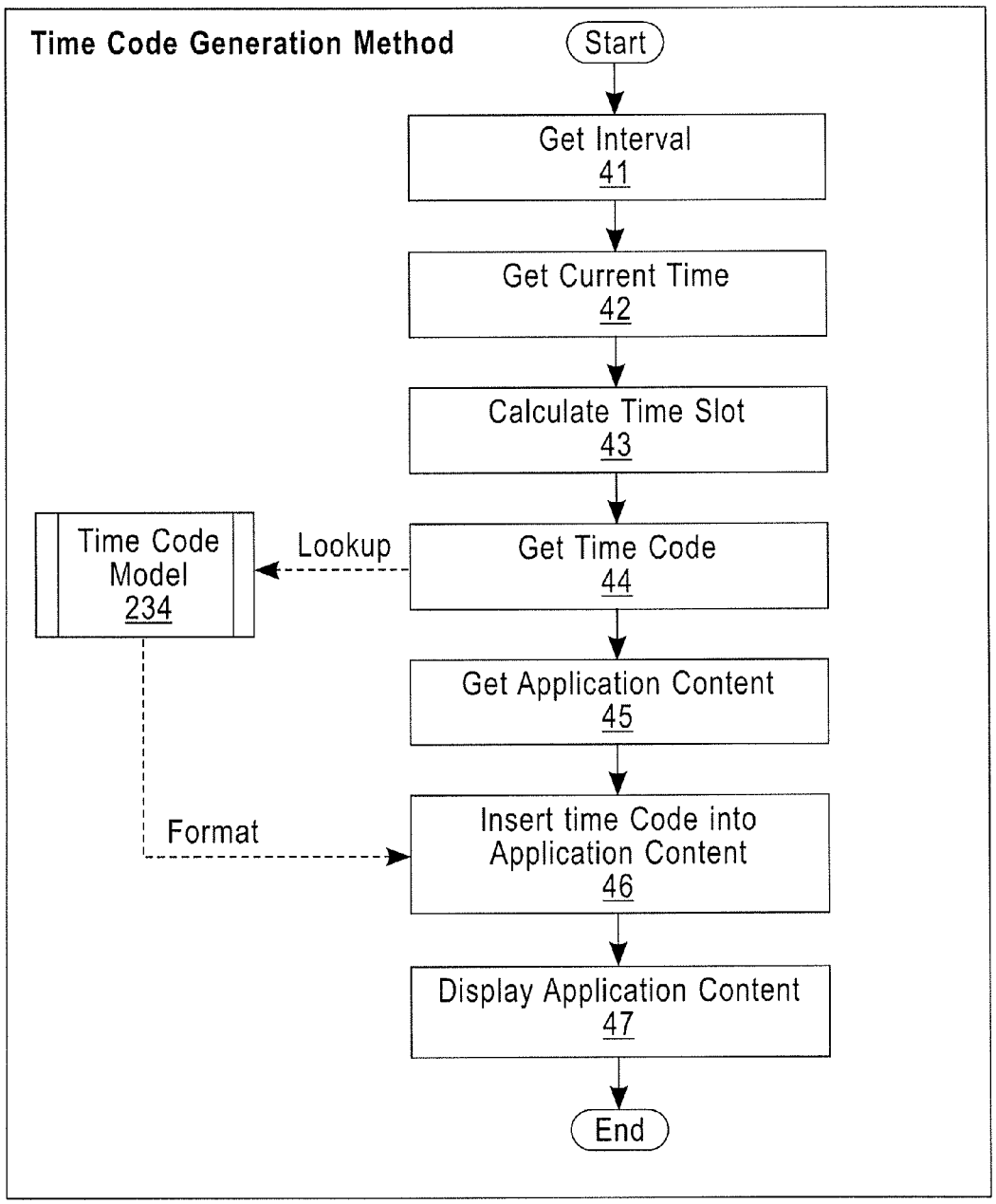
FIG. 4 is a flow chart of a method for time code generation, according to an embodiment of the disclosure.

FIG. 4 is a flow chart of a method for time code generation, according to an embodiment of the disclosure. A time code generation method according to an embodiment of the disclosure can generate an appropriate time code and insert it into the content to be displayed. An exemplary, non-limiting example of time code generation again uses a product selling scenario.

Referring now to the flow chart, a method begins at step 41 with a system according to an embodiment of the disclosure obtaining the predefined interval 222, such as 1 hour. At step 42, a system according to an embodiment of the disclosure reads the current system time, e.g. 12:32 AM.

Using both the interval (e.g. 1 hour) and the current system time (e.g. 12:32 AM), the time slot is calculated at step 43. In an illustrative scenario according to an embodiment of the disclosure, the time slot is 1 since the current time falls inside the first hour of the day and the interval is defined as one hour. Table 2 shows some examples of possible combinations between a time slot, an interval, and a time window.

Once calculated, the time slot serves as the index on the time code model to retrieve the respective time code at step 44. Using the example in Table 1, the time code is AAA1. The time code together with the interval specifies a certain period of interest.

At step 45, the display application generates content to be presented. In an illustrative scenario according to an embodiment of the disclosure, the content may be a list of products for sale, in which each product has a description and an identifier. The identifier can be used to indicate the item to be purchased.

At step 46, the content generated by the display application is enriched with timing information by inserting the time code data. The time code model 234 defines how the time code data is added into the application content. An illustrative scenario according to an embodiment of the disclosure may specify that the time code should be inserted into the product identifier at the beginning. Thus, the time code AAA1 may appear in each product ID being displayed during the 12:00-12:59 AM period. Finally, at step 47, the content is presented on the display.

Figure 5:
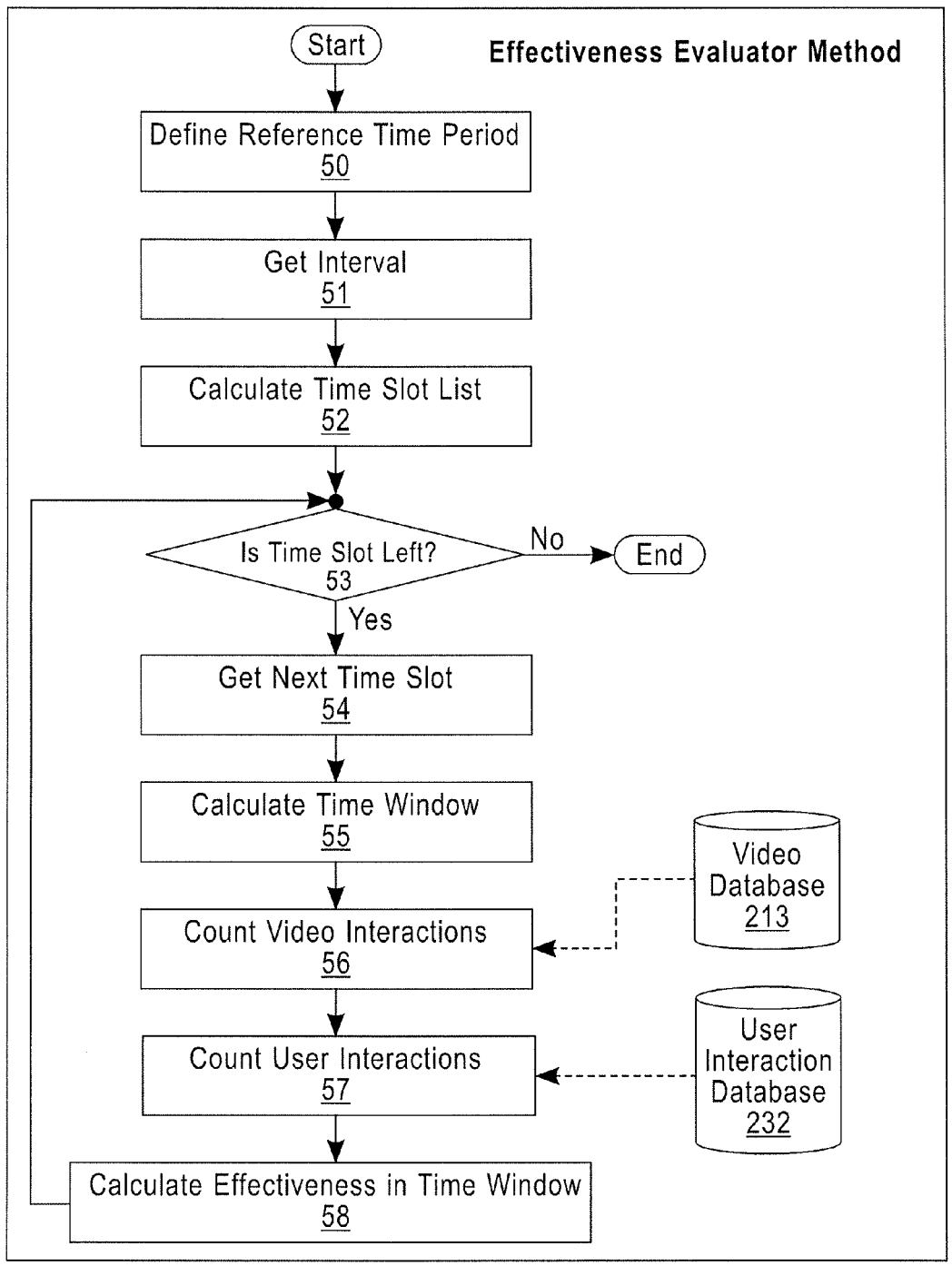
FIG. 5 is a flow chart of a method for evaluating effectiveness according to an embodiment of the disclosure.

FIG. 5 is a flow chart of a method for evaluating effectiveness according to an embodiment of the disclosure. A method according to an embodiment of the disclosure can determine an effectiveness of a display application over a period of time. An exemplary, non-limiting period of time is an entire day.

Referring now to the figure, a method according to an embodiment of the disclosure by having a requester of the display effectiveness analysis defining the period to be analyzed at step 50, which is the reference time period 221. The period may be defined by a start and an end time. For example, for an analysis over an entire day, the start time would be 12:00 AM and the end time would be 11:59 PM. At step 51, the predefined interval 222 is read from the global settings. In an illustrative scenario according to an embodiment of the disclosure, the interval value may be 1 hour. Using both the interval (one-hour) and search time (12:00 AM-11:59 PM), a time slot list is calculated at step 52 by the time window generator 223. In an illustrative scenario according to an embodiment of the disclosure, the list may contain 24 entries (1-24).

At step 53, a system according to an embodiment of the disclosure loops through the list one slot at a time, obtaining the next slot in the list through each of the 24 slots until no slot is left. At step 54, if there is a next time slot in the list, the next time slot is selected for effectiveness calculation. A time window is calculated from the time slot and interval values at step 55. In an illustrative scenario according to an embodiment of the disclosure, the time window will increment by one-hour in each loop, starting from 12:00 AM-12:59 AM. The last loop for time slot 24 will produce the time window 11:00 PM-11:59 PM. The time window may be an index into the video database 213 and into the user interaction database 232. At step 56, for each time window, the respective number of video interactions in the particular period is counted in events, e.g face tracking events, retrieved from the video database 213. At step 57, for each time window, the respective number of user interactions in this particular period is counted in the time indexed user interaction data retrieved from the user interaction database 232. Using the video interactions count and the user interaction count from the previous steps, the effectiveness for a particular period can be calculated at step 58 from:

$$\text{Effectiveness} = (\text{Users Interaction count} / \text{Video Events count}) \times 100$$

After a method according to an embodiment of the disclosure has ended, the effectiveness of all 24 hours can be determined and presented in a timeline. This can show how effective the display application is at each hour of the day.

As a further illustrative scenario according to an embodiment of the disclosure, consider a department store using displays for in-store advertisement, where video cameras set in strategic positions capture customers' faces when they are looking at the displays. In addition, assume that this display is presenting a kind of advertisement that engages customers by means of commercial benefits, such as discounts, only when a customer answers this advertisement. The content published on the display may instruct customers to send a simple SMS (Short Message Text) with the code in the advertisement, to participate.

In this illustrative scenario according to an embodiment of the disclosure, the department store promotes daily different ads, but always one each hour. The same ads can be broadcast during the week in different periods, such as in the morning or afternoon. Several customers will see this advertisement and some of them will send the SMS while they are in front of a display, but other customers may make a note of the advertisement code and in a later moment, e.g. when they are at home, send an SMS to also participate.

According to an embodiment of the disclosure, the department store may find all customers who sent an SMS, whether when in front of a display or later, for a particular advertisement presented at a specific day and time. Also, using the data from the cameras, the department store may determine the number of people who watched this ad when it was displayed. Correlating information, a system according to an embodiment of the disclosure may calculate an effectiveness for this advertising for each specific period of time:

$$\text{Effectiveness(Period)} = (\text{Users who sent SMS} / \text{Users present on Video}) \times 100$$

Now, this department store, using results from the display effectiveness, can analyze the different times this advertisement was present on the display during the whole week and determine what are the best or most effective periods of time to present this advertisement.

A method according to an embodiment of the disclosure can allows for the automatic optimization of allocated resources, such as the displays, and may make them more effective with respect to the content being presented, so that impulse buy may be more likely.

As will be appreciated by one skilled in the art, embodiments of the present disclosure may be embodied as a system, method or computer program product. Accordingly, embodiments of the present disclosure may take the form of an entirely hardware embodiment, an entirely software embodiment (including firmware, resident software, microcode, etc.) or an embodiment combining software and hardware embodiments that may all generally be referred to herein as a "circuit," "module" or "system." Furthermore, embodiments of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
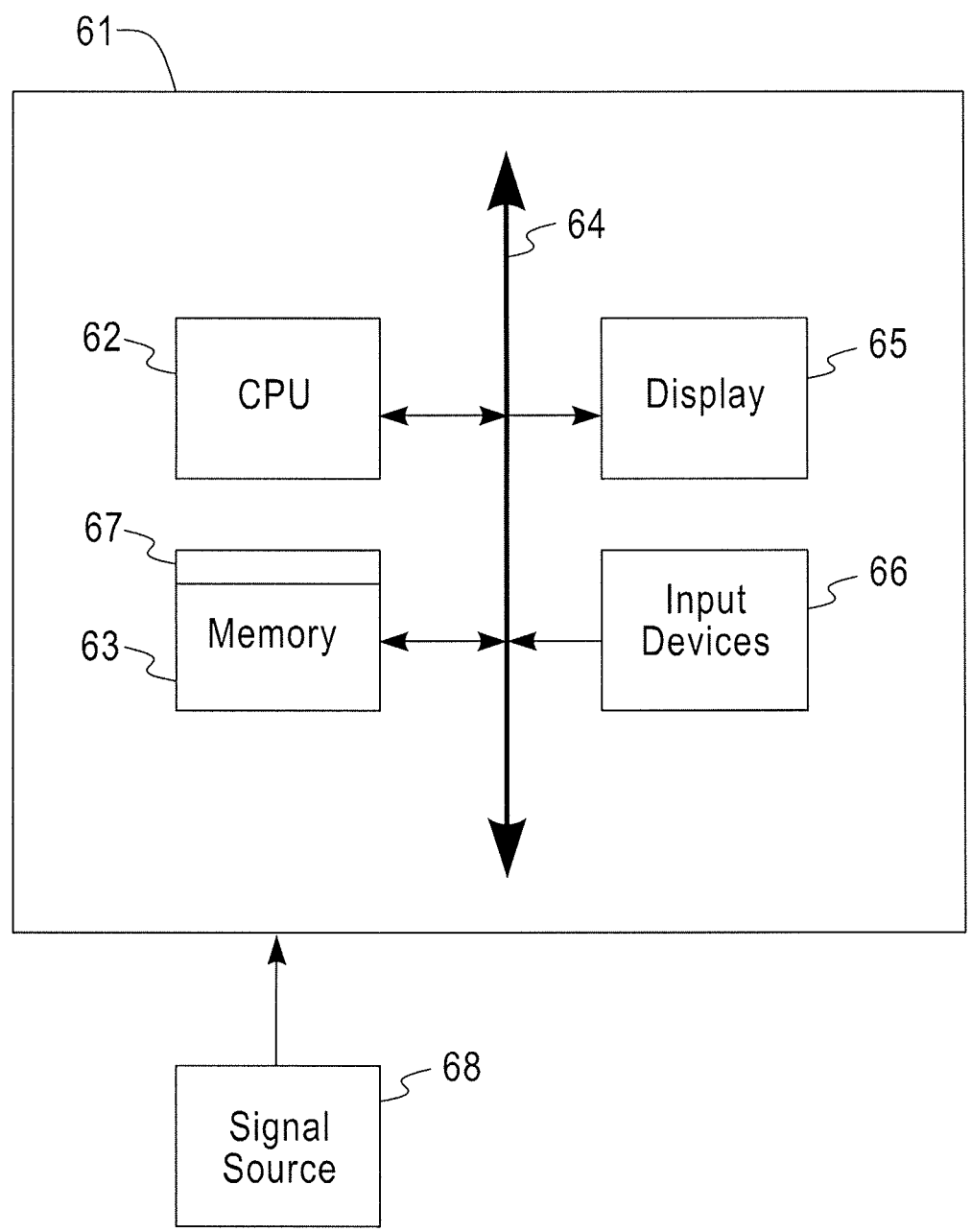
FIG. 6 is a block diagram of an exemplary computer system for implementing a method for measuring the effectiveness of content being presented on a display to produce an interaction by a viewer, according to an embodiment of the disclosure.

FIG. 6 is a block diagram of an exemplary computer system for implementing a method for measuring the effectiveness of content being presented on a display to produce an interaction by a viewer according to an embodiment of the disclosure. Referring now to FIG. 6, a computer system 61 for implementing the present disclosure can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present disclosure can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present disclosure.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A system to measure effectiveness of displayed content, comprising:
one or more video cameras;
a video processing service configured to receive and process a stream of video images captured by the one or more video cameras;
one or more display monitors;
a display application service configured to produce display content to be displayed on the one or more display monitors and to capture user interactions with the displayed content; and
a display effectiveness service configured to correlate data received from the video processing service and the display application service and generate a display effectiveness measurement that is a measure of an effectiveness of the displayed content for specific periods of time, wherein the display effectiveness service comprises:
a time window module configured to generate a time slot list for a reference time period in increments defined by an interval;
a video event counter module configured to count from a sequence of face tracking events a number of people viewing content on a display over the reference time period;
an interaction counter module configured to count from user interaction data indexed with an extracted time period a number of people who viewed the displayed content over the reference time period and interacted with the displayed content; and
an effectiveness evaluator that relates the number of people viewing content on a display with the number of people who interacted with the displayed content over the a preferential search time to determine an effectiveness over the extracted time period as a function of the interval.

2. The system of claim 1, wherein user interactions are captured when a user views the content on a display monitor, or after the user has viewed the displayed content.

3. The system of claim 1, wherein user interaction data includes information associated with a viewing time of the content.

4. The system of claim 1, wherein the video processing service uses face detection and face tracking algorithms to analyze the stream of video images to detect faces and to track the detected faces through consecutive images in the stream of video images, and stores face tracking events as a sequence of face tracking events in a video database.

5. The system of claim 4, wherein the display application service comprises:
a time code model that associates unique codes that identify specific periods of time to time slots;
a time code parser configured to extract data regarding a time period from user interaction data and store the user interaction data indexed with the extracted time period into a user interaction database;
a time code generator configured to generate a code that identifies based on the time code model a particular period of time at which content will be displayed; and
an application content module configured to insert the code created by the time code generator into the content to be displayed on the one or more display monitors.

6. The system of claim 1, wherein the effectiveness evaluator uses the following equation to calculate the effectiveness:

Effectiveness(interval)=[Users Interaction(interval)/
    Video Users(interval)]×100, wherein Users Interaction is the number of people who interacted with the displayed content during the interval, and Video Users is the number of people who viewed content on the display during the interval.

7. A non-transitory program storage device readable by a computer, tangibly embodying a program of instructions executed by the computer to perform method steps for measuring effectiveness of displayed content, the method comprising the steps of:
determining a time window over which an effectiveness of displayed content displayed on a plurality of display monitors is to be calculated;
receiving video data from a plurality of video cameras, wherein said video data includes time stamps;
analyzing said video data to detect and track faces in the data;
calculating a tracking period for each detected face from the time stamps;
saving face tracking events and the tracking periods in said sequence of time-indexed face tracking events to a database;
counting a number of viewers viewing content being displayed on a display monitor of the plurality of display monitors over the time window from the sequence of time-indexed face tracking events of viewers viewing content on said display monitor;
counting a number of viewers who responded to said content displayed on said display monitor over the time window from a sequence of time indexed viewer interaction data of viewers responding to said content displayed on said display monitor; and
calculating an effectiveness for the time window that relates the number of people viewing content on a display with the number of people who interacted with the displayed content from Effectiveness (lime window)=[Users Interaction
    (time window)/Video Users (time window)]×
    100, wherein Users Interaction is the number of people who responded to said content displayed during the time window, and Video Users is the number of people who viewed the content during the time window.

8. The computer readable program storage device of claim 7, wherein viewers respond to said content displayed during the time window when the content is being displayed, or after the time window during which the content was displayed.

9. The computer readable program storage device of claim 7, wherein determining a time window over which an effectiveness of displayed content is to be calculated comprises:
determining a reference time period over which said effectiveness will be calculated;
determining an interval for subdividing the reference time period into a plurality of time slots; and
generating a list of time slots for the reference time period, wherein the effectiveness is calculated for each time slot in the time slot list, and the time window for each time slot is determined from the interval.

10. The computer readable program storage device of claim 7, the method further comprising:
receiving a sequence of user interaction data of viewers responding to the content displayed on said display monitor;
extracting a time code from an item of user interaction data in the sequence of user interaction data;
calculating the time window from the time code using an interval that specifies a duration of the time window;
associating said time window with said user interaction data item; and
saving the user interaction data item and the associated time window in said sequence of time-indexed viewer interaction data.

11. The computer readable program storage device of claim 7, the method further comprising:
determining a time slot from an interval that specifies a duration of the time window and a current time;
determining a time code associated with said time slot;
inserting said time code into application content to be displayed; and
displaying said application content with said inserted time code.

12. The computer readable program storage device of claim 10, wherein said time code is extracted from said item of user interaction data using a time code model, the time code model is used to associate a time slot with the time code, and the time slot is associated with the interval to determine the time window.

13. A non-transitory program storage device readable by a computer, tangibly embodying a program of instructions executed by the computer to perform method steps for measuring effectiveness of displayed content, the method comprising the steps of:
determining a time window over which an effectiveness of displayed content displayed on a plurality of display monitors is to be calculated;
counting a number of viewers viewing content being displayed on a display monitor of the plurality of display monitors over the time window from a sequence of time-indexed face tracking events of viewers viewing content on said display monitor;
receiving a sequence of user interaction data of viewers responding to the content displayed on said display monitor;
extracting a time code from an item of user interaction data in the sequence of user interaction data;
calculating the time window from the time code using an interval that specifies a duration of the time window;
associating said time window with said user interaction data item;
saving the user interaction data item and the associated time window in said sequence of time-indexed viewer interaction data;
counting a number of viewers who responded to said content displayed on said display monitor over the time window from the sequence of time indexed viewer interaction data of viewers responding to said content displayed on said display monitor; and
calculating an effectiveness for the time window that relates the number of people viewing content on a display with the number of people who interacted with the displayed content from $$\text{Effectiveness (time window)} = [\text{Users Interaction (time window)} / \text{Video Users (time window)}] \times 100,$$

wherein Users Interaction is the number of people who responded to said content displayed during the time window, and Video Users is the number of people who viewed the content during the time window.

14. The computer readable program storage device of claim 13, wherein viewers respond to said content displayed during the time window when the content is being displayed, or after the time window during which the content was displayed.

15. The computer readable program storage device of claim 13, wherein determining a time window over which an effectiveness of displayed content is to be calculated comprises:
determining a reference time period over which said effectiveness will be calculated;
determining an interval for subdividing the reference time period into a plurality of time slots; and
generating a list of time slots for the reference time period,
wherein the effectiveness is calculated for each time slot in the time slot list, and the time window for each time slot is determined from the interval.

16. The computer readable program storage device of claim 13, the method further comprising:
receiving video data from a plurality of video cameras, wherein said video data includes time stamps;
analyzing said video data to detect and track faces in the data;
calculating a tracking period for each detected face from the time stamps; and
saving face tracking events and the tracking periods in said sequence of time-indexed face tracking events.

17. The computer readable program storage device of claim 13, the method further comprising:
determining a time slot from an interval that specifies a duration of the time window and a current time;
determining a time code associated with said time slot;
inserting said time code into application content to be displayed; and
displaying said application content with said inserted time code.

18. The computer readable program storage device of claim 16, wherein said time code is extracted from said item of user interaction data using a time code model, the time code model is used to associate a time slot with the time code, and the time slot is associated with the interval to determine the time window.

* * * * *